United States Patent
Kaminaka et al.

(10) Patent No.: US 6,881,518 B2
(45) Date of Patent: Apr. 19, 2005

(54) PROCESS FOR MANUFACTURE OF NEGATIVE ELECTRODE MATERIAL FOR A NON-AQUEOUS ELECTROLYTE SECONDARY BATTERY

(75) Inventors: Hideya Kaminaka, Nishinomiya (JP); Masaru Abe, Koube (JP); Noriyuki Negi, Amagasaki (JP); Yoshiaki Nitta, Hirakata (JP); Harunari Shimamura, Hirakata (JP); Kazuhiro Okamura, Hirakata (JP)

(73) Assignees: Sumitomo Metal Industries, Ltd., Osaka (JP); Matsushita Electric Industrial Co., Ltd., Kadoma (JP)

(*) Notice: Subject to any disclaimer, the term of this patent is extended or adjusted under 35 U.S.C. 154(b) by 76 days.

(21) Appl. No.: 10/355,051

(22) Filed: Jan. 31, 2003

(65) Prior Publication Data

US 2003/0175589 A1 Sep. 18, 2003

Related U.S. Application Data (62) Division of application No. 09/567,048, filed on May 8, 2000, which is a continuation of application No. PCT/JP99/04775, filed on Sep. 3, 1999.

(30) Foreign Application Priority Data

Sep. 8, 1998 (JP) .......................................... 10-253981

(51) Int. Cl.[7] .............................................. H01M 4/58
(52) U.S. Cl. ............................. 429/218.1; 429/231.95
(58) Field of Search ....................................... 429/218.1

(56) References Cited

U.S. PATENT DOCUMENTS

| | | |
|---|---|---|
| 3,969,139 A | 7/1976 | Lai |
| 4,048,395 A | 9/1977 | Lai |
| 4,346,152 A | 8/1982 | Sammells et al. |
| 5,656,394 A | 8/1997 | Koksbang et al. |
| 5,869,208 A | 2/1999 | Miyasaka |
| 6,090,505 A * | 7/2000 | Shimamura et al. ..... 429/218.1 |
| 6,235,427 B1 | 5/2001 | Idota et al. |
| 6,300,013 B1 | 10/2001 | Yamada et al. |

FOREIGN PATENT DOCUMENTS

| | | |
|---|---|---|
| JP | 3-280363 | 11/1991 |
| JP | 5-159780 | 6/1993 |
| JP | 06325764 A | 11/1994 |
| JP | 7-240201 | 12/1995 |
| JP | 9-636651 | 7/1997 |
| JP | 63-13264 A | 1/1998 |
| JP | 10162823 A | 6/1998 |
| JP | 10-199524 A | 7/1998 |
| JP | 11-86853 A | 3/1999 |
| JP | 11-176470 A | 7/1999 |
| JP | 11-214004 A | 8/1999 |
| JP | 11-242954 A | 9/1999 |

* cited by examiner

*Primary Examiner*—Mark Ruthkosky
(74) *Attorney, Agent, or Firm*—Burns, Doane, Swecker & Mathis, L.L.P.

(57) ABSTRACT

A negative electrode material for a nonaqueous electrolyte secondary battery having a high discharge capacity and a good cycle life is made from alloy particles having an average particle diameter of 0.1–50 μm and including Si phase grains 40 and a phase of a solid solution or an intermetallic compound of Si and other element selected from Group 2A elements, transition elements, Group 3B elements, and Group 4B elements from the long form periodic table (for example, an $NiSi_2$ phase 42 and an $[NiSi_2+NiSi]$ phase 41) at least partially enveloping the Si phase grains. 5–99 wt % of this material is Si phase grains. The alloy particles can be manufactured by rapid solidification (such as atomization or roller quenching) of a melt including Si and the other element, or by adhering the other element to Si powder by electroless plating or mechanical alloying and then performing heat treatment. Even if rapid solidification is carried out, a negative electrode material having a good discharge capacity and cycle life is obtained without heat treatment.

16 Claims, 1 Drawing Sheet

PROCESS FOR MANUFACTURE OF NEGATIVE ELECTRODE MATERIAL FOR A NON-AQUEOUS ELECTROLYTE SECONDARY BATTERY

This application is a divisional application of U.S. application Ser. No. 09/567,048, filed May 8, 2000, which is a continuation of PCT/JP99/04775, filed Sep. 3, 1999.

TECHNICAL FIELD

This invention relates to a material in the form of a powder for a negative electrode for a non-aqueous electrolyte secondary battery which can reversibly occlude and release large amounts of alkali metals such as Li, and to manufacturing processes for the negative electrode material. This invention also relates to a process for manufacturing a negative electrode formed from this negative electrode material and to a non-aqueous electrolyte secondary battery using this negative electrode material and which is improved with respect to charge and discharge capacity as well as to cycle life.

A non-aqueous electrolyte secondary battery according to this present invention includes both batteries using a non-aqueous electrolyte in solution of a supporting electrolyte dissolved in an organic solvent, and batteries using a solid non-aqueous electrolyte in the form of a polymer electrolyte, a gel electrolyte, or the like.

TECHNICAL BACKGROUND

As portable, small electric and electronic devices become more widespread and improve in performance, the production of non-aqueous electrolyte secondary batteries typified by lithium ion secondary batteries has greatly increased, and improvements in their capacity and cycle life are continuously demanded.

At present, in typical non-aqueous electrolyte secondary batteries, carbon materials are primarily used as negative electrode materials. However, in negative electrodes made from carbon materials, Li can only be occluded up to the composition $LiC_6$. Therefore, the theoretical maximum limit on the capacity is 372 mAh/g, which is only approximately 1/10 that for the case for metallic lithium, and there is a limit on increases in capacity.

Metallic lithium, which was initially used as a negative electrode material, can provide a high capacity, but repeated charging and discharging of a battery cause the precipitation and growth of dendrite crystals, leading to the occurrence of short-circuiting, so the cycle life of charging and discharging was short, and it was not practical.

With the object of obtaining a high capacity, it has been proposed to use the element Al, which can reversibly occlude and release Li by the formation of an intermetallic compound, as a negative electrode material. However, due to changes in volume accompanying occlusion and release, the negative electrode material tends to form cracks which causes powderization or comminution of the material into a fine powder. Therefore, in secondary batteries using this negative electrode material, as cycles of charging and discharging progress, the capacity abruptly decreases, so they have a short cycle life.

As a measure to prevent this powderization of a negative electrode material caused by changes in volume, it has been proposed to add Li, Si, B, or the like to Al in a negative electrode material in order to increase the lattice constant of the aluminum material in advance (Japanese Published Unexamined Patent Application No. Hei 3-280363). However, the effect is inadequate, and it is not possible to sufficiently increase the cycle life.

It has also been proposed to occlude and release Li within the lattice of silicides or other intermetallic compounds (Japanese Published Unexamined Patent Applications Nos. Hei 7-240201, Hei 9-63651, etc.), but in each case, a significant effect was not obtained.

Various types of negative electrode materials for non-aqueous electrolyte secondary batteries and negative electrodes formed from those materials have been proposed, but a negative electrode material having a structure which can best exhibit the performance of those materials and a process for its manufacture have not been proposed.

DISCLOSURE OF THE INVENTION

An object of this invention is to provide a negative electrode material for a non-aqueous electrolyte secondary battery which can occlude and release large amounts of Li and which therefore, when used as a negative electrode material for a non-aqueous electrolyte secondary battery, provides a high charge and discharge capacity, a small decrease in capacity during repeated charging and discharging, and an excellent cycle life.

Another object of this invention is to provide a negative electrode material having a structure which enables a non-aqueous electrolyte secondary battery equipped with a negative electrode made from this negative electrode material to best exhibit its properties and to a manufacturing process for the negative electrode.

Silicon (Si) can reversibly occlude and release Li through the formation of an intermetallic compound with Li (such as $Li_{22}Si_5$). The charge and discharge capacity of Si when it is used in a negative electrode material for non-aqueous electrolyte secondary batteries is theoretically a high value of approximately 4020 mAh/g (9800 mAh/cc: specific gravity of 2.33). This theoretical maximum capacity is far larger than the theoretical maximum capacity of 372 mAh/g (844 mAh/cc: specific gravity of 2.27) of carbon materials which are actually used at present, and even compared with the theoretical maximum capacity of 3900 mAh/g (2100 mAh/cc: specific gravity of 0.53) for metallic lithium, it has a far larger electrode capacity per unit volume, which is important from the standpoint of reducing the size of batteries. Accordingly, Si can be used as a high capacity negative electrode material.

However, as is the case with Al, a negative electrode material made from Si metal easily turns to fine powder due to cracks formed by changes in volume accompanying occlusion and release of Li, so its capacity greatly decreases as charging and discharging cycles continue, and its cycle life is short. Therefore, up to the present, there have been almost no attempts using Si as a negative electrode material.

The present inventors noticed the high theoretical capacity of a negative electrode material made from Si. As a result of investigations aimed at increasing the cycle life thereof, they found that if the surface of Si phase grains is enveloped in a phase of an Si-containing solid solution or intermetallic compound, changes in volume accompanying occlusion and discharge of Li are restrained, so cracking and powderization of Si can be prevented, and the cycle life is increased. In order to sufficiently obtain this effect so that the restraint by the solid solution or intermetallic compound used for enveloping will be effective, the Si phase preferably has a small grain size. Such small Si phase grains can be efficiently formed by a rapid (cooling) solidification method.

The present invention provides a negative electrode material for a non-aqueous electrolyte secondary battery, which is made from alloy particles of a structure comprising one or more Si phase grains and a phase of an Si-containing solid solution or intermetallic compound which at least partially envelops the Si phase grains, wherein the average particle diameter of the alloy particles is at least 0.1 μm and at most 50 μm, and the Si phase grains constitutes at least 5 wt % and at most 99 wt % of the negative electrode material.

The "Si-containing solid solution or intermetallic compound" which envelops the Si phase grains in the alloy particles can be constituted by Si and at least one element selected from the group consisting of Group 2A elements, transition elements, Group 3B elements, and Group 4B elements other than Si of the long form periodic table.

The negative electrode material for a non-aqueous electrolyte secondary battery can be manufactured by the processes described below.

One process comprises a step of cooling a melt of raw materials for forming alloy particles (elemental Si+ at least one element capable of forming a solid solution or an intermetallic compound with Si) for solidification so as to obtain a cooling rate of at least 100° C. per second, thereby forming an alloy comprising Si phase grains and a phase of an Si-containing solid solution or intermetallic compound which at least partially envelops the Si phase grains. This process may further include a step of subjecting the alloy obtained in the solidification step to heat treatment at a temperature at least 10° C. below the solidus temperature of the solid solution or the intermetallic compound. The purpose of this heat treatment is to remove strains which develop within the alloy due to the rapid solidification. It can be carried out when the extent of strains is large. The cooling of the melt at a cooling rate of at least 100° C. per second can be carried out by a method selected from the group consisting of the atomization method, the roller quenching method, and the rotating electrode method.

Another manufacturing process comprises a step of forming an adhering layer of a material which contains an element capable of forming a solid solution or an intermetallic compound with Si, on the surface of a powder of metallic Si or an alloy having an Si phase, and a step of subjecting the powder having the adhering layer to heat treatment at a temperature at least 10° C. below the solidus temperature of the solid solution or the intermetallic compound to convert the material forming the adhering layer into an Si-containing solid solution or intermetallic compound. The adhering layer can be formed by a plating method or a mechanical alloying method.

In either of the above-described manufacturing processes, it is preferable that the alloy particles which are formed contain on the average at least 5 wt % and at most 99 wt % of Si phase grains, and that the average particle diameter of the alloy particles be at least 0.1 μm and at most 50 μm.

According to this invention, a manufacturing process for negative electrodes for non-aqueous electrolyte secondary batteries is also provided. This process is characterized in that a powder of metallic Si or of an alloy containing an Si phase is adhered atop a negative electrode substrate to form a powder layer on the substrate, thereafter a material comprising an element capable of forming a solid solution or an intermetallic compound with Si is plated on the powder layer, and then heat treatment is performed at a temperature at least 10° C. below the solidus temperature of the solid solution or intermetallic compound such that the plating is converted into an Si-containing solid solution or intermetallic compound.

The present invention also relates to a non-aqueous electrolyte secondary battery equipped with a non-aqueous electrolyte and positive and negative electrodes which can reversibly occlude and release lithium, characterized in that the negative electrode contains the above-described negative electrode material, or it contains a negative electrode material manufactured by either of the above-described processes for manufacturing a negative electrode material, or it is a negative electrode manufactured by the above-described process for manufacturing a negative electrode.

The negative electrode may contain at least 5 wt % and at most 80 wt % of a carbon material with respect to the above-described negative electrode material. The positive electrode preferably comprises a lithium-containing transition metal compound as an active material, and the non-aqueous electrolyte is preferably a solution of a lithium salt dissolved in an organic solvent containing a carbonate ester.

DESCRIPTION OF MODES OF THE INVENTION

Below, a negative electrode material according to the present invention and processes for its manufacture, a process for manufacturing a negative electrode made from this negative electrode material, and a non-aqueous electrolyte secondary battery utilizing this negative electrode material will be described in detail. In the following explanation, unless otherwise indicated, all the percents relating to material compositions refer to percent by weight (wt %).

Negative Electrode Material

A negative electrode material according to this invention is made from alloy particles of a structure comprising one or more Si phase grains as a core, and a phase of an Si-containing solid solution or intermetallic compound which at least partially envelopes the Si phase grains (referred to below as an enveloping material). The enveloping material may be a mixture of an Si-containing solid solution and intermetallic compound, and it may further include other phases.

The Si phase grains forming the core are an active substance for a negative electrode. By forming an intermetallic compound with Li (such as $Li_{22}Si_5$), they can reversibly combine with and dissociate from lithium. Namely, at the time of charging, they combine with Li to occlude Li, and at the time of discharging, they disassociate from Li to release Li. The Si phase grains may include other phases dispersed therein provided that the Si phase is a matrix of the grains.

The phase of an Si-containing solid solution or intermetallic compound which is the enveloping material restrains changes in volume of the Si phase accompanying occlusion and release of Li and it suppresses cracking and powderization thereof, thereby increasing the cycle life. Even if the Si phase grains which are the negative electrode active material are completely enveloped by the enveloping material, since Li ions have an extremely small ion radius, they can easily pass through the lattice of the enveloping material to reach the Si phase core and can combine therewith. In the same manner, Li ions which have disassociated from the Si phase can pass through the enveloping material and be released into the electrolyte solution. Namely, the enveloping material can restrain volume changes of the Si phase grains without substantially impeding the passage of Li ions.

The object of enveloping is to restrain volume changes of the Si phase grains which are the active material of negative electrodes. Theoretically, a material which does not contain Si may be used as the enveloping material. However, if the enveloping material is detached from the core, it can not achieve its objective. In order to prevent this detachment, the enveloping material is made of a phase of an Si-containing solid solution or intermetallic compound which solidifies at the same time as the Si phase or which can be formed by the diffusion of Si from Si element in the core which it envelops.

The enveloping material may completely envelop the core of Si phase grains or may partially envelop it. Even in the case in which it partially envelops it, the above-described objective of restraint can be substantially achieved. Particularly in industrial production, it is difficult to completely envelop all of the Si phase grains in the strict sense of the word, and it is also difficult to ascertain whether complete envelopment has taken place.

The individual alloy particles which make up the powdery negative electrode material may contain a single Si phase grain or a plurality of Si phase grains. In the case in which it contains a single Si phase grain, the alloy particle is a particle in which the periphery of this single Si phase grain is at least partially enveloped by the enveloping material. When an alloy particle includes a plurality of Si phase grains, typically the Si phase grains are dispersed within the matrix of the enveloping material (the Si phase grains are relatively minute, and the proportion of the enveloping material is relatively large). However, a case in which a plurality of the above-described alloy particles containing a single Si phase grain are joined together with the proportion of the enveloping material being relatively small is also possible. In one negative electrode material, alloy particles containing a single Si phase grain and alloy particles containing a plurality of Si phase grains may be mixed.

The average diameter of the Si phase grains in the alloy particles is preferably at least 0.01 $\mu$m and at most 40 $\mu$m, and more preferably it is at least 1 $\mu$m and at most 35 $\mu$m. If the average diameter of the Si phase grains forming the core exceeds 40 $\mu$m, it may be difficult for the above-described restraint to work effectively, or the average particle diameter of the alloy particles may exceed 50 $\mu$m, thereby making it difficult to prevent powderization of Si and deterioration in cycle life. If the average diameter of the Si phase grains is less than 0.01 $\mu$m, surface oxidation and the like of the alloy particles at the time of manufacture can easily take place, and handling becomes difficult. In the case in which an alloy particle contains a plurality of Si phase grains, the average diameter of the Si phase grains is preferably at most 20 $\mu$m.

The average particle diameter of the alloy particles is at least 0.1 $\mu$m and at most 50 $\mu$m. If the average particle diameter of the alloy particles exceeds 50 $\mu$m, the packing density of the negative electrode material in electrodes become small and the capacity thereof decreases. Furthermore, as described above, the average diameter of the Si phase grains is preferably at most 40 $\mu$m, so if the average particle diameter exceeds 50 $\mu$m, the thickness of the enveloping material becomes too great, the proportion represented by the Si phase decreases, and as a result the capacity of the negative electrode material becomes small. If the average particle diameter of the alloy particles is smaller than 0.1 $\mu$m, the enveloping material becomes too thin, and it becomes difficult for the above-described restraint to work effectively. The average particle diameter of the alloy particles is preferably at least 1 $\mu$m and at most 40 $\mu$m, and more preferably at least 5 $\mu$m and at most 35 $\mu$m.

For both the Si phase grains and the alloy particles, when the particle shape is irregular (non-spherical), such as flake shaped (thin pieces), the particle diameter of an alloy particle is the average of its minor axis and its major axis. The average value with respect to particle volume of the particle diameter of the alloy particles determined in this manner is taken as the average particle diameter.

The diameter of the Si phase grains can be measured by a scanning electron microscope (SEM), for example. Various methods can be used to measure the particle diameter of the alloy particles. For example, the median diameter of the volume particle distribution measured with a laser diffraction particle size measuring apparatus can be taken as the average particle diameter, and this method is used in the examples.

The Si phase grains constitute 5 to 99 wt % of the negative electrode material. Preferably, the remainder is comprised essentially of a phase of an Si-containing solid solution or intermetallic compound (namely, the alloy particles consists essentially of this phase and Si phase grains). However, if there is no extreme adverse effect on negative electrode properties, a third phase not containing Si may be present in the alloy particles. If the proportion of the Si phase exceeds 99 wt %, the thickness of the enveloping material becomes too small, and it becomes difficult for the enveloping material to have an effective restraining effect. If the proportion of the Si phase is less than 5 wt %, it will give a negative electrode material having a too small capacity. The proportion of the Si phase is preferably at least 8 wt % and at most 95 wt % and more preferably at least 10 wt % and at most 50 wt %.

As stated above, the material forming the enveloping material comprises an Si-containing solid solution or intermetallic compound in order to prevent detachment of the material from the core of Si phase grains. Elements for forming the Si-containing solid solution or intermetallic compound are preferably one or more metal elements selected from the group consisting of Group 2A elements (alkali earth metals), transition elements, Group 3B (boron group) elements, and Group 4B (carbon group) elements other than Si in the long form periodic table.

Preferred examples of the above elements are the Group 2A elements Mg, Ca, and Ba; the transition elements Nd, Pr, Ce, and other rare earth elements, and Ti, Cr, W, Mn, Fe, Co, Ni, and Cu; the Group 3B elements Al, Ga, In, and Tl; and the Group 4B elements Ge, Sn, and Pb. Of these, more preferred elements are Mg, Ca, W, Fe, Co, and Ni.

Manufacturing Process for a Negative Electrode Material

A negative electrode material for a non-aqueous electrolyte secondary battery according to the present invention made from alloy particles having a structure in which one or more Si phase grains are at least partially enveloped in an enveloping material of an Si-containing solid solution or intermetallic compound can be manufactured by either of the two manufacturing processes which will be now described.

[Manufacturing Process 1]

A melt which is obtained by melting raw materials for forming alloy particles (namely, a mixture of Si and one or more elements which can form a phase of a solid solution or intermetallic compound with Si) is cooled so as to obtain a solidification speed (cooling rate during solidification) of at least 100° C. per second to solidify it, whereby an alloy in which Si phase grains are at least partially enveloped in an Si-containing solid solution or intermetallic compound is formed. If necessary, the solidified material can be heat treated at a temperature at least 10° C. below the solidus temperature of the Si-containing solid solution or intermetallic compound forming the enveloping material, and/or it can be subjected to grinding. When heat treatment is carried out, grinding may be performed either before or after heat treatment.

In this first process, as a result of solidification of the above-described melt, an alloy is formed in which Si phase grains are at least partially enveloped in an Si-containing solid solution or intermetallic compound. By performing rapid cooling so as to obtain a cooling rate of at least 100° C. per second to perform solidification, many nuclei for precipitation are formed. Therefore, in the case of a multiphase alloy, the phase of the primary crystal which first precipitates and the phases which precipitate after that become minute. Namely, in the case of the above-described alloy, both the Si phase and the phase of an Si-containing solid solution or intermetallic compound have fine grain sizes.

The alloy structure formed by precipitation of various phases during solidification greatly varies with the alloy composition. In the case in which the alloying raw materials have a composition corresponding to an eutectic alloy, the Si phase and the phase of an Si-containing solid solution or intermetallic compound precipitates simultaneously, and an alloy structure is obtained in which the Si phase and the phase of an Si-containing solid solution or intermetallic compound are finely mixed. In the case in which the Si phase is a primary crystal, an alloy is obtained with a structure in which the fine Si phase grains which precipitate first are at least partially enveloped in the fine phase of an Si-containing solid solution or intermetallic compound (in some cases this phase is eutectic with the Si phase) which precipitates afterwards or are enclosed therein. In the case in which the phase of an Si-containing solid solution or intermetallic compound is the primary crystal, numerous fine grains initially precipitate from this phase, and then fine Si phase grains (which may also be eutectic) precipitate at the grain boundaries of the primary crystal. As a result, an alloy is obtained having a structure in which fine Si phase grains are dispersed in the phase of an Si-containing solid solution or intermetallic compound. Either alloy structure can be said to be an alloy in which fine Si phase grains are at least partially enveloped in a phase of an Si-containing solid solution or intermetallic compound.

The molten raw materials should be rich in Si compared to the composition of the Si-containing solid solution or intermetallic compound phase which becomes the enveloping material. Depending on the proportion of Si to other elements in the raw materials, the proportion of the negative electrode material constituted by the Si phase grains formed during solidification is determined. Alloy particles which are manufactured by Process 1 may possibly include a single Si phase grain, but normally they include a plurality of Si phase grains. This process has relatively simple manufacturing steps.

If the cooling rate is less than 100° C. per second, the Si phase grains which precipitate grow and become too coarse, and the average diameter thereof may exceed 40 $\mu$m. The cooling rate is preferably at least 1000° C. per second. The upper limit on the cooling rate is not restricted, but industrially it is preferably at most on the level of $10^{6°}$ C. per second.

As cooling methods for achieving a cooling rate of at least 100° C. per second (referred to below as rapid solidification methods), atomization, roller quenching, and rotating electrode methods are preferable, taking into consideration the completeness of manufacturing technology, suitability for mass production, costs, and the like. Of these methods, atomization and rotating electrode methods provide an alloy in the form of a powder.

For atomization, either of gas atomization and liquid atomization is possible, but gas atomization which results in the formation of nearly spherical particles is preferred. In either case, in order to prevent oxidation of the alloy, the melting and solidification environment are preferably maintained in a non-oxidizing atmosphere (for example, in a vacuum or an inert gas atmosphere).

In gas atomization, alloying raw materials having a prescribed composition are normally melted in a vacuum or an inert atmosphere in a high frequency induction melting furnace. The molten alloy (melt) which is formed is dropped into an atomizing tank through a melt supply pipe. A nozzle is installed near the melt supply pipe, and an atomizing gas is blown out from a hole or slit of the nozzle at the dropping melt. The melt is scattered by the discharged gas into droplets, which rapidly solidifies to form a powder. The powdery alloy which is formed is led to a powder storing apparatus from the bottom of the atomizing tank and is stored therein.

The particle diameter of the powder which is formed by gas atomization normally becomes smaller as the energy of the gas which is blown at the dripping melt increases. The energy of the blown gas can be adjusted by, for example, the pressure of the gas and the size or position of the hole or slit in the nozzle. For blown gas having the same energy, the particle diameter of the powder normally becomes smaller as the amount of dropped melt per unit time decreases. The amount of dropped melt can be adjusted by the inner diameter of the melt supply pipe and the pressure applied to the melt within the melt supply pipe.

Roller quenching is a method in which a melt of an alloying raw material having a prescribed composition is poured in a thin layer onto the outer periphery of a cooled rotating roll whereby the heat of the poured melt is withdrawn rapidly by the cooled roll to effect rapid cooling. Both a single roll and twin rolls can be used. The melt is normally housed in a tundish, and a controlled amount is poured from a nozzle in the bottom thereof. The cooling rate of an alloy using roller quenching can be controlled based on the rotational speed of the roll, the amount of melt which is poured, and the like.

In the case of single-roller quenching, the rotational speed of the roll is typically such that the peripheral speed at the outer periphery is in the range of $1\times10^{-2}$ to $6\times10^{2}$ meters per second. A roll having a diameter of 100–600 mm is relatively frequently used. From the standpoint of practicality, the roll diameter is preferably 400–600 mm, and the roll peripheral speed is preferably $6\times10^{-2}$–$1.3\times10^{2}$ meters per second.

The alloy which is rapidly cooled and solidified by the roll normally has the shape of foils and/or flakes, which drop off from the roll and are recovered by a suitable storage apparatus. The alloy which is obtained is generally extremely thin, so it can be easily ground into a powder by a mechanical grinding means (such as a ball mill, a jet mill, or the like). Both the grinding and roller quenching are preferably carried out in an inert gas atmosphere.

The rotating electrode method is a method in which an alloy having a prescribed composition is cast to form an electrode, and while the electrode is rotated at a high speed within a closed chamber at a reduced pressure, it is successively melted starting from the tip by an arc from a counter electrode, whereby the resulting melt is scattered and rapidly cooled and solidified within the chamber to form a powder. There are also variations on this method in which the melting is carried out with a plasma arc or a laser. The counter electrode is normally made of tungsten. The electrode is frequently cylindrical with a diameter of 30 to 50 mm, but ones with a larger diameter also exist. The rotational speed of the electrode is normally on the order of 1000–5000 rpm, but there are cases in which a higher rotational speed is employed.

In the case of an Si alloy having a high melting temperature, a plasma arc rotating electrode method in which the alloy electrode is melted with a plasma arc is preferred. Ar or He is frequently used as a plasma arc gas. The particle diameter of the powder is determined primarily by the rotational speed and diameter of the electrode. The particle diameter of the powder decreases as the rotational speed of the electrode is increased or the electrode diameter is decreased. A suitable cooling means is provided on the counter electrode or the chamber.

An alloy which is formed by rapid solidification according to the first process, taking an Ni—Si alloy as an example, is one in which Si-phase grains coexist with an $NiSi_2$ phase and an NiSi phase, which are intermetallic compounds. In this example, among the three phases, the Si phase, which has the highest solidification temperature, precipitates first during solidification and forms primary crystals, and then in the periphery of the primary crystals of Si phase, $NiSi_2$ crystallizes out due to a reaction between the liquid phase and the Si phase. Finally, the remaining liquid phase crystallizes out as eutectic crystals of NiSi and $NiSi_2$ to completely solidify. As shown in FIG. 4, spherical alloy particles which are formed by solidification by gas atomization or rotating electrode method have a solidified structure having Si phase grains 40 which are enveloped by an $NiSi_2$ phase 42. The $NiSi_2$-enveloped Si phase grains are dispersed within a matrix of a ($NiSi_2$+NiSi) eutectic phase 41. These alloy particles frequently have a structure in which a plurality of Si phase grains are present in a single alloy particle.

In rapid solidification, each of the phases which precipitates is minute, so the Si phase grains in the alloy which is formed have an average diameter which is normally at most 25 $\mu$m, and particularly with atomization or roller quenching which have a higher cooling rate, the average diameter is frequently at most 10 $\mu$m. Depending on the composition of the alloy, only one type or two or more types of Si-containing intermetallic compound may precipitate together with the Si phase. With some alloying elements, an Si-containing solid solution may be formed during solidification in place of or in addition to an intermetallic compound. In either case, the phase having the lowest solidification temperature normally becomes a fine grain matrix, in which Si phase grains are present.

The alloy which is formed by rapid solidification is subjected to grinding, if necessary, and alloy particles having an average particle diameter of at least 0.1 $\mu$m and at most 50 $\mu$m are obtained. Even with atomization or rotating electrode method which provide an alloy in the form of a powder, the resulting alloy powder may be subjected to grinding as necessary or required. Grinding can be carried out by a ball mill or other conventional means.

Alloy particles which are manufactured utilizing a rapid solidification method sometimes have strains remaining therein due to the rapid cooling. A material having strains tends to cause powderization during use, leading to a short cycle life. Accordingly, the alloy particles may be heat treated to remove strains due to rapid cooling. In the case in which grinding is carried out, heat treatment may be carried out either before grinding or after grinding. In order to prevent oxidation of the negative electrode material during heat treatment, heat treatment is preferably carried out in a non-oxidizing atmosphere such as a vacuum or an inert gas atmosphere.

Heat treatment is carried out at a temperature at least 10° C. below the solidus temperature of the Si-containing intermetallic compound or solid solution forming the enveloping material. In cases in which there are two or more phases forming the enveloping material, as shown in FIG. 4, a temperature at least 10° C. below the solidus temperature of the primary phase of the Si-containing intermetallic compound or solid solution present in the larger amount can be used (the primary phase can be determined from the composition or from a phase diagram: in the case of FIG. 4, it is the $NiSi_2$ phase). A preferred heat treatment temperature is at least 20° C. below the solidus temperature.

In addition to removing strains due to rapid cooling, the heat treatment produces diffusion. According to the observations of the present inventors, the state of change of each phase when the alloy shown in FIG. 4 was subjected to heat treatment was as follows.

In the initial stage of heat treatment, NiSi within the matrix 41 made up of the ($NiSi_2$+NiSi) phase was supplied Si from the $NiSi_2$ phase 42 surrounding the particulate Si phase 40 and was converted into $NiSi_2$. On the other hand, the $NiSi_2$ phase 42 took in the Si in which it was deficient due to this supplying from the adjoining Si phase 40. As a result, the Si phase 40 contracted having a reduced average grain diameter. After all the NiSi in the ($NiSi_2$+NiSi) phase 41 was converted to $NiSi_2$, the alloy particles became an alloy made up of two phases, i.e., of the $NiSi_2$ phase forming the matrix and the dispersed Si phase grains 40. If heat treatment is further continued, due to Ostwald growth whereby relatively large Si phase grains while relatively small Si phase grains disappear, the average diameter of the Si phase grain increases. There is no substantial change in the average particle diameter of the alloy particles.

Heat treatment is preferably carried out under such conditions that the average diameter of the Si phase grains 40 after heat treatment does not exceed 40 $\mu$m. If the heat treatment temperature is higher than 10° C. below the solidus temperature, the diameter of the Si phase grains forming the core becomes too big, and depending upon the accuracy of temperature control of the heat treatment furnace which is used, the solidus temperature may end up being exceeded, sintering of the powder may take place, and subsequent grinding becomes necessary, so higher temperatures are not appropriate. The lower limit on the heat treatment temperature is not restricted so long as strains caused by rapid cooling can be removed, but it is preferably at least 300° C. and more preferably at least 500° C. The duration of heat treatment is at least two hours, taking into consideration the diffusion speed of the elements making up the alloy particles, and at least 4 hours are particularly preferable.

Heat treatment normally causes the average diameter of the Si phase grains to increase and the weight percentage thereof to decrease. This is because Si in the Si phase is consumed by the above-described conversion of NiSi to $NiSi_2$. As a result of a decrease in the weight percentage of the Si phase which is the negative electrode active material, heat treatment gives a tendency for the charge and discharge capacity to decrease.

When a negative electrode material according to the present invention is manufactured by rapid solidification, atomization or roller quenching which have a higher cooling rate results in the formation of an alloy structure having Si phases which are finely dispersed due to rapid cooling. Therefore, even if strains remain to a certain extent in the solidified alloy, it was ascertained that a negative electrode material having a good cycle life is obtained without heat treatment. Accordingly, using a process with high productivity in which a time-consuming heat treatment process is omitted, a negative electrode material having greatly improved capacity and good cycle life can be manufactured.

[Manufacturing Process 2]

On the surface of a powder of metallic Si or an alloy containing an Si phase (referred to below as an Si phase powder), an adhering layer is formed of a material including an element which can form a solid solution or intermetallic compound with Si, and then heat treatment is performed at a temperature at least 10° C. below the solidus temperature of the solid solution or intermetallic compound. Namely, this is a process in which a core of Si phase grains is formed in advance, and an enveloping material surrounding it is then formed utilizing adhesion and thermal diffusion.

In this second process, heat treatment is used to diffuse the Si which is present within the Si phase powder into the adhering layer, whereby the material forming the adhering layer is converted into an Si-containing solid solution or intermetallic compound, and alloy particles are formed in which the core of Si phase grains is at least partially enveloped by the Si-containing solid solution or intermetallic compound. Such particles are also included in the "alloy" particles of the present invention. In the case in which the powder is made of metallic Si, the alloy particles may often include a single Si phase grain.

The Si phase powder may be a powder of metallic Si, but it may be a powder of an Si alloy as long as Si phase has been precipitated therein. Although not limited thereto, an example of such an alloy is an Ni—Si alloy.

The Si phase powder preferably has a shape without sharp corners, and it also preferably has a spherical shape in which the ratio of its major axis diameter to its minor axis diameter is at most 3. If the powder has sharp corners, it is difficult for the adhering layer to be formed uniformly. If the shape is spherical, it becomes difficult for powderization to take place, and the shape is also advantageous in that it becomes easy to make the thickness of the adhering layer uniform. The Si phase powder may be manufactured by a mechanical grinding method, but it is advantageous to manufacture it by roller quenching, atomization, or rotating electrode method. Among these, gas atomization and rotating electrode method which obtain powder of nearly spherical shape are preferred.

Whatever method is used to manufacture it, the Si phase powder preferably has an average particle diameter of at most 40 $\mu$m. If the average particle diameter of the powder exceeds 40 $\mu$m, the Si phase grains forming the core become large, it becomes difficult for the intermetallic compound formed thereon to bind effectively the core and prevent powderization upon the occlusion and release of Li.

It is not necessary for the Si phase powder to be made of single particles. Complex particles in which a plurality of particles are joined together, such as by sintering, may also be used. In the case of fine powder having a particle diameter of at most 10 $\mu$m, if the adhering layer is formed on the surface thereof in that state, the proportion of the elements in the adhering layer with respect to the weight of the powder becomes high, which is not desirable. In such a case, the fine powder can be partially sintered to form complex particles so as to decrease the proportion of the elements in the adhering layer with respect to the adhering powder. The average particle diameter of the complex particles is preferably at most 40 $\mu$m.

On the surface of the Si phase powder, a material including one or more elements which can form an intermetallic compound or solid solution with Si (referred to below as a second element) is deposited or adhered to form an adhering layer. The adhering layer may contain Si in addition to the second element, and it may contain an element other than one which can form an intermetallic compound or solid solution with Si, if present in a small amount. The second element can be adhered by either a chemical method such as plating or a physical method such as mechanical alloying (MA method).

The thickness of the adhering layer made from the second element is preferably on the order of 0.05–10 $\mu$m. If it is less than 0.05 $\mu$m, the thickness of the enveloping material formed from the adhering layer (the Si-containing intermetallic compound or solid solution) becomes small, it becomes difficult for restraint of volume changes occurring with occlusion and release of Li to work effectively, and the cycle life of the electrode decreases. If the thickness of the adhering layer exceeds 10 $\mu$m, the amount of the Si phase grain which is the negative electrode active material becomes relatively small, and the capacity of the negative electrode decreases.

Among methods for forming the adhering layer, plating method can be performed by electrolytic plating, but it involves passing a current through all of the powder which requires a complex procedure. Therefore electroless plating is more convenient. Examples of the second element which can be deposited by electroless plating include Ni, Co, Pd, Cu, Ag, Au, Pt, Pb, Rh, and Ru. When the surface of the Si phase powder is covered with an oxide film or the like which interferes with plating, the oxide film can be removed by appropriate means such as pickling prior to electroless plating. It is also effective to use a metal plating assistant such as Pd or Sn to increase the adhesion of the electroless plating.

In the case in which the second element forming the adhering layer is an element which is difficult to plate, the second element can be adhered to the Si phase powder by the MA method. The MA method is a method in which the Si phase powder and a powder of the second element (which can be manufactured by the same method as for the Si phase powder) are together charged into a high energy mill such as a planetary ball mill or a disintegrator-type mill and mixed together, resulting in adhesion of the powder of the second element to the surface of the Si alloy powder.

The average particle diameter or the powder of the second element used in the MA method is smaller than that of the Si alloy powder and is preferably at most 10 $\mu$m. If it exceeds 10 $\mu$m, there is the possibility of the thickness of the layer of the second element which is adhered to the surface of the Si alloy powder exceeding 10 $\mu$m, and the proportion of the amount of the second element with respect to the amount of the Si layer increases, which is not desirable. There is no particular lower limit on the average particle diameter of the powder of the second element, but taking into consideration contamination such as oxidation of the powder, the average particle diameter is preferably at least 1 $\mu$m. The adhering amount of the powder of the second element with respect to the amount of the Si phase powder is preferably on the order of 10–30 percent.

When the adhering layer is formed by the MA method, a small amount (such as 0.1–5 wt % and preferably 0.5–2 wt % of the powder of the second element) of a ceramic powder may be mixed with the powder of the second element. The ceramic powder used may be formed of one or more classes such as SiC, $Si_3N_4$, TiC, $TiB_2$, and $Al_2O_3$. The ceramic powder preferably has an average particle diameter smaller than that of the powder of the second element. In this manner, by forming an enveloping material in which a ceramic is finely dispersed, the restraining effect of the enveloping material is strengthened, and the cycle life can be further increased.

As a method for forming the adhering layer, it is also possible to employ a method in which the powder of the second element is made coatable by a binder, such as an organic binder or the like which can be removed by heat treatment in a subsequent step, and is coated on the Si phase powder, or a method in which a melt of the second element is sprayed on the Si phase powder, or the like.

After an adhering layer of the second element is formed on the Si phase powder by a suitable method such as those described above, heat treatment is performed. As a result of the diffusion phenomenon which is produced by this heat treatment, Si in the Si phase powder diffuses into the adhering layer and combines with the elements in the adhering layer or forms a solid solution within the adhering layer. As a result, the adhering layer is converted into a layer of an Si-containing solid solution or intermetallic compound, whereby alloy particles according to the present invention in which the surface of the Si phase grains is enveloped in a layer of an Si-containing solid solution or intermetallic compound are obtained.

For example, in the case where an Ni adhering layer is formed on the surface of Si phase powder by electroless plating and then heat treatment is carried out, Si diffuses into the Ni adhering layer and combines with Ni to form the intermetallic compound $NiSi_2$. As a result, alloy particles are obtained in which the periphery of Si phase grains is enveloped in an enveloping material of an $NiSi_2$ phase.

The temperature of heat treatment for this diffusion should be lower than the solidus temperature of the primary solid solution or intermetallic compound which is formed by this diffusion. From the standpoint of preventing sintering of the powder to itself during the heat treatment, a temperature at least 10° C. below the solidus temperature is preferable. In consideration of hastening the diffusion of elemental Si and the elements in the adhering layer, the lower limit on the heat treatment temperature is preferably at least 500° C. The duration of heat treatment should be sufficient for diffusion. Normally it is at least two hours and preferably it is at least four hours. The heat treatment atmosphere is preferably a non-oxidizing atmosphere such as a vacuum or an inert gas atmosphere.

This heat treatment also serves to remove rapid cooling strains if the Si phase powder is manufactured by the above-described rapid solidification and strains generated by the MA method if this method is used to adhere the adhering layer to the Si alloy phase powder, so additional heat treatment for strain removal is not necessary.

Negative Electrode Manufacture
[Manufacturing Process A]

A negative electrode material according to the present invention which is constituted by alloy particles comprising Si phase grains enveloped in an Si-containing solid solution or intermetallic compound can be made into a negative electrode for a non-aqueous electrolyte secondary battery using electrode manufacturing processes well known to those skilled in the art.

For example, a suitable binder can be mixed with a powder of a negative electrode material according to the present invention manufactured in accordance with the above-described first process or second process, and if necessary a suitable electrically conducting powder is mixed therewith to increase conductivity. A solvent which can dissolve the binder is added to the mixture, and it is thoroughly stirred to form a slurry. Using a homogenizer or glass beads if necessary. The slurry can be coated with a doctor blade or the like on an electrode substrate (serving as a current collector) such as a rolled copper foil or an electroplated copper foil. After it is dried, it is compacted by rolling or the like, thereby providing a negative electrode for a non-aqueous electrolyte secondary battery.

Examples of the binder include PVDF (polyvinylidene fluoride), PMMA (polymethyl methacrylate), PTFE (polytetrafluoroethylene), water insoluble resins such as styrene-butadiene rubber and the like (which are also insoluble in the solvent used in a non-aqueous electrolyte for a battery), and water soluble resins such as CMC (carboxymethylcellulose), PVA (polyvinyl alcohol), and the like. As the solvent, depending upon the binder, organic solvents such as NMP (N-methylpyrrolidone), DMF (dimethylformamide), or the like can be used, as can water.

The electrically conducting powder may be made of either a carbon material (such as carbon black or graphite) or a metal (such as Ni), but a carbon material is preferred. Carbon materials can occlude Li ions between the layers thereof, so in addition to imparting electrical conductivity, they contribute to the capacity of a negative electrode, and they also have excellent liquid retention. A preferred carbon material is acetylene black.

When a carbon material is blended in the negative electrode, the carbon material is preferably used in an amount of at least 5 wt % and at most 80 wt % with respect to the negative electrode material of alloy particles according to the present invention. If the amount is less than 5 wt %, a sufficient electrical conductivity is not imparted, and if it exceeds 80 wt %, the capacity of the negative electrode decreases. A more preferred amount is at least 20 wt % and at most 50 wt %.

As a variation on this process, after an adhering layer is formed on Si phase grains according to the above-described Manufacturing Process 2, using powder prior to the performance of heat treatment, a slurry can be formed in the manner described above and coated on an electrode substrate. In this case, instead of a drying step, or after final rolling, heat treatment is performed such that Si is diffused into the adhering layer to form an enveloping material of an Si-containing solid solution or intermetallic compound. Namely, the heat treatment step of Manufacturing Process 2 can instead be performed at the time of electrode manufacture.

[Manufacturing Process B]

In another manufacturing process for a negative electrode for a non-aqueous electrolyte secondary battery according to the present invention, Si phase powder is subjected to a manufacturing step for an electrode as described above without forming an adhering layer or performing heat treatment, and then formation of an adhering layer of a second element (one or more elements which can form an intermetallic compound or a solid solution with Si) and heat treatment are carried out.

Namely, in this process, in the same manner as described above, an Si phase powder is mixed with a binder and if necessary an electrically conducting powder (such as a carbon material) to form a slurry, which is coated on an electrode substrate, dried, and if necessary compacted by rolling or the like to form a layer of an Si phase powder on the surface of the electrode substrate. Thereafter, a layer of a material containing the second element is adhered to the Si phase powder layer. In this case, since the MA method can not be used to form the adhering layer, a plating method is appropriate. As the plating method, electroless plating can of course be used, but since Si phase powders are already connected to each other to allow electrical current to pass through all the powders, electrolytic plating is also suitable. The second element which is plated is present not only on the surface of the Si phase powder layer but enters into the spaces in the Si phase powder and partially envelops the surface of the Si phase powder.

Heat treatment is performed after plating, whereby the Si within the Si phase powder diffuses into the adhering layer formed by plating, the adhering layer is converted into a phase of an Si-containing solid solution or intermetallic compound, resulting in the formation of a negative electrode made of a negative electrode material according to the present invention of alloy particles comprising Si phase grains at least partially enveloped in a phase of an Si-containing solid solution or intermetallic compound. The heat treatment conditions can be the same as the conditions described with respect to Manufacturing Process 2 (the process in which an adhering layer of a second element is formed) for the negative electrode material.

The thickness of the Si phase powder layer is preferably at most 40 $\mu$m. If it exceeds 40 $\mu$m, it may be impossible to prevent powderization due to volume changes in the grains at the time of occlusion and release of Li. The thickness of the adhering layer is preferably at least 0.05 $\mu$m and at most 10 $\mu$m. If it is less than 0.1 $\mu$m, the restraining effect on Si phase grains is small, and if it exceeds 10 $\mu$m, the amount of the Si phase becomes relatively small, and the capacity for occlusion and release of Li becomes small. If the thickness of the electrode is too small and the capacity of the negative electrode is insufficient with a single Si phase powder layer, it is possible to alternatingly coat and plate an Si phase powder layer and an element of an adhering layer, respectively, prior to heat treatment, so as to make a multilayer structure.

When a negative electrode is manufactured in accordance with Manufacturing Process B in which a layer of Si phase powder is formed by coating on an electrode substrate followed by plating to form an adhering layer and heat treatment, only a small amount of elements for the adhering layer are necessary, and it is possible to carry out the formation of the adhering layer in an ordinary electrode manufacturing line, which is advantageous for a decrease in costs, control of investment in equipment, and an increase in productivity.

Non-aqueous Electrolyte Secondary Battery

Using a negative electrode manufactured in the above-described manner, a non-aqueous electrolyte secondary battery is manufactured. A representative example of a non-aqueous secondary battery is a lithium ion secondary battery. A negative electrode material and a negative electrode according to the present invention are suitable for use in a lithium ion secondary battery. However, in theory, they can also be applied to other non-aqueous electrolyte secondary batteries.

As a basic structure, a non-aqueous electrolyte secondary battery includes a negative electrode, a positive electrode, a separator, and a non-aqueous electrolyte. The negative electrode is one manufactured in accordance with the present invention as described above, and the other elements, the positive electrode, the separator, and the electrolyte may be appropriately selected from those which are well known in the art or which will be developed in the future.

The positive electrode of a lithium ion secondary battery is preferably one using an Li-containing transition metal compound as an active material. Examples of an Li-containing transition metal compound are compounds expressed by $LiM_{1-x}M'_xO_2$ or $LiM_{2-y}M'_yO_4$ (wherein $0 \leq X$, $Y \leq 1$, M and M' are at least one substance selected from Ba, Co, Ni, Mn, Cr, Ti, V, Fe, Zn, Al, In, Sn, Sc, and Y). However, other positive electrode materials such as transition metal chalcogenides, vanadium oxides and their lithium-containing derivatives, niobium oxide and their lithium-containing derivatives, conjugate polymers and other electrically conducting organic substances, Chevrel's phase compounds, activated carbon, activated carbon fibers, or the like may be used.

The positive electrode can be manufactured in the same manner as the above-described Manufacturing Process A for a negative electrode in which a positive electrode material in the form of a powder, a binder, and if necessary a conducting material are formed into a slurry, the slurry is coated on electrode substrate, and compaction is performed. The average particle diameter of the positive electrode material is preferably in the range of 1–30 $\mu$m. PVDF and PTFE are preferred as a binder for the positive electrode, and a carbon material is preferred as an electrically conducting material.

The electrolyte for a lithium ion secondary battery is generally a non-aqueous electrolyte solution of a lithium salt as a supporting electrolyte dissolved in an organic solvent. Examples of the lithium salt include $LiClO_4$, $LiBF_4$, $LiAlCl_4$, $LiPF_6$, $LiAsF_6$, $LiSbF_6$, $LiB(C_6H_5)$, $LiCF_3SO_3$, $LiCH_3SO_3$, $Li(CF_3SO_2)_2N$, $LiC_4F_9SO_3$, $Li(CF_2SO_2)_2$, LiCl, LiBr, LiI, LiSCN, lithium salts of lower aliphatic carboxylic acids, chloroborane-lithiumm, lithium tetraphenylborate and the like. One or more of these salts may be used.

As the organic solvent, one or more of carbonate ester solvents including cyclic carbonate esters such as ethylene carbonate, propylene carbonate, and vinylene carbonate and chain or noncyclic carbonate esters such as ethyl methyl carbonate, dimethyl carbonate, and diethyl carbonate; aliphatic carboxylate esters such as methyl formate, ethyl acetate, and methyl propionate; $\gamma$-lactones such as $\gamma$-butyrolactone; chain ethers such as 1,2-dimethoxyethane; cyclic ethers such as tetrahydrofuran, and other various aprotic solvents such as dimethylsulfoxide, dioxoranes, amides, nitriles, and sulforanes may be used. Preferred solvents are a mixed solvent of carbonate esters, which may be further mixed with an aliphatic carboxylate ester. A mixed solvent of ehtylene carbonate and ethyl methyl carbonate is particularly preferred.

There is no particular limit on the concentration of the supporting electrolyte in the solvent, but normally it is in the range of 0.2–2 M, and in particular it is preferably in the range of 0.5–1.5 M.

The nonaqueous electrolyte need not be be a liquid (solution) but may be a solid. Solid electrolytes for use in nonaqueous electrolyte secondary batteries are roughly classified into inorganic solid electrolytes and organic solid electrolytes. Inorganic solid electrolytes are known to include lithium nitride, halides, and oxo-acid salts. Among others, $Li_4SiO_4$, $Li_4SiO_4$—LiI—LiOH, $xLi_3PO_4$—(1-x)$Li_4SiO_4$, $Li_2SiS_3$, $Li_3PO_4$-$Li_2S$—$SiS_2$, phosphorus sulfide compounds are effective. As organic solid electrolytes, for example, polyethylene oxide, polypropylene oxide, polyphosphazene, polyaziridine, polyethylene sulfide, polyvinyl alcohol, polyvinylidene fluoride, polyhexafluoropropylene and similar polymeric materials, as well as their derivatives, mixtures, and composites are effective.

Other compounds can be added to the non-aqueous electrolyte for the purpose of improving charging and discharging properties. Some examples of such compounds include triethyl phosphite, triethanolamine, cyclic ethers, ethylenediamine, n-glymes, pyridine, hexaphosphortriamide, nitrobenzene derivatives, crown ethers, quaternary ammonium salts, ethylene glycol dialkyl ethers, and the like.

The separator serves as an electrically insulating membrane for electrically insulating the positive electrode and the negative electrode, and it also contributes to retention of the non-aqueous electrolyte. An electrically insulating microporous membrane having a high ion permeability and a suitable mechanical strength is used as the separator. In order to increase the safety of the battery, one having pores which close up when a fixed temperature is reached to increase the resistance is preferred.

Taking into consideration resistance to organic solvents and hydrophobicity, a microporous sheet, a non-woven fabric, a woven fabric, or the like made from a polyolefin polymer or glass fibers is often used as a separator. The pore size of the separator is preferably on the order of 0.01–1 μm so that materials which are detached from the electrode can not pass through the separator. The thickness of the separator is generally on the order of 10–300 μm. In general, it is preferred that the porosity of the: separator be in the range of 30–80%.

As one type of lithium secondary battery, there is a battery having a structure in which a positive electrode and a negative electrode include a polymer which absorbs and retains a non-aqueous electrolyte solution, and the same non-aqueous electrolyte solution is absorbed and retained in a polymer of a separator. In this case, a copolymer of vinylidenefluoride and hexafluoropropylene is particularly preferred as a polymer material for absorbing and retaining an organic electrolyte solution.

There is no particular restriction on the shape of the non-aqueous electrolyte secondary battery. It can be cylindrical, rectangular, coin shaped, button shaped, sheet shaped, laminar, flat, or a large shape for an electric automobile. A non-aqueous electrolyte secondary battery according to this invention, although not limited thereto, can be used in a portable information terminal, a portable electronic device, a small electric power storage device for household use, a motorcycle, an electric automobile, a hybrid electric automobile, and the like.+

INDUSTRIAL APPLICABILITY

A negative electrode material according to the present invention or a negative electrode material manufactured according to the process of the present invention or a non-aqueous electrolyte secondary battery using the negative electrode uses an Si phase, which has a high theoretical capacity, as an active material (an Li occluding substance) for a negative electrode, so it has a high capacity. In addition, due to the periphery of Si phase grains being enveloped in a phase of a Si-containing solid solution or intermetallic compound and volume changes of the Si phase grains being restrained, volume changes at the time of charging and discharging in the case of an Si phase being used as a negative electrode active material are effectively prevented, so it is difficult for a decrease in cycle life due to powderization to take place, and the cycle life is excellent.

The present invention can provide a negative electrode material for a non-aqueous electrolyte secondary battery and a negative electrode, the material having an extremely high discharge capacity compared to a negative electrode material made from a conventional carbon material and a good cycle life of at least 80%, and being able to contribute to increases in performance of lithium ion secondary batteries and other non-aqueous electrolyte secondary batteries.

EXAMPLES

A negative electrode test used to evaluate negative electrode materials and negative electrodes for nonaqueous electrolyte secondary batteries will be described.

(Negative Electrode Test)

A powdery negative electrode material to be tested was classified to obtain a powder with an average particle diameter of 30 μm. To the powder, poly(vinylidene fluoride) was added as a binder in the proportion of 10 wt % based on the weight of the powder and then N-methylpyrrolidone was added as a solvent also in the proportion of 10 wt % to dissolve the poly(vinylidene fluoride) binder. To this mixture, a powder of a carbon material (acetylene black) was added as an electrically conducting powder in the proportion of 10 wt % based-on the weight of the mixture and thoroughly mixed to obtain a uniform slurry.

The slurry was applied to an electroplated copper foil having a thickness of 30 μm, dried, and compacted by rolling, after which it was punched using a punch having a diameter of 13 mm. The resulting disk members were used as negative electrodes for nonaqueous electrolyte secondary batteries. The thickness of a layer of the negative electrode material formed on the copper foil was about 100 μm.

The properties of the negative electrodes as single electrodes were evaluated with a so-called three-electrode cell equipped with a counter electrode and reference electrode both made of lithium metal. As an electrolyte solution, a 1M solution of $LiPF_6$ as a supporting electrolyte dissolved in a mixed solvent of ethylene carbonate and dimethoxyethane at a ratio of 1:1 was used. Measurements were made at 25° C. in an atmosphere having a dew point of around −70° C. while the cell was placed in a device such as a glove box capable of maintaining an inert atmosphere.

Charging was initially performed at a 1/10 charge hour rate, i.e., with a current required to reach a full charge by charging for 10 hours, until the negative electrode had a potential of 0 V with respect to the reference electrode. Then, discharging was carried out with the same current until the reference electrode had a potential of 2 V with respect to the negative electrode. The discharge capacity in this first cycle at this time was used as the discharge capacity of the negative electrode formed from the negative electrode material. The charging and discharging cycle was repeated, the discharge capacity was measured at the 300th cycle, and the cycle life was measured by the following equation in terms of % capacity retention after 300 cycles. A cycle life of at least 80% was considered acceptable. Cycle life (%)=(discharge capacity in 300th cycle/discharge capacity in 1st cycle)×100

The discharge capacity in the 1st cycle is the capacity during the discharging following the first charging, and the discharge capacity in the 300th cycle is the capacity during the discharging following the 300th charging.

Negative electrodes prepared by the above-described Manufacturing Process B were evaluated in the same manner as above using the above-described three-electrode cell.

In all the examples, the discharge capacity is expressed in the units mAh/cc (in which cc is the volume of the negative electrode plate calculated from the area of the negative electrode plate and the thickness of the negative electrode material).

Example 1

This example illustrates the case in which a negative electrode material according to the present invention is manufactured in accordance with the above-described Manufacturing Process 1 (rapid solidification method). The gas atomization, the single-roller quenching, and the plasma rotating electrode method were used as cooling methods.

First, the solidification speed or the cooling rate at the time of solidification of each method was measured using an Al-4 wt % Cu alloy.

[Measurement of Cooling Rate]
(Single-Roller Quenching)

A single roll comprising a core made of carbon steel with a diameter of 20 mm and an outer peripheral portion made of Cu with a thickness of 10 mm was rotated at a rotational speed of 2,000 rpm. A molten raw material of an Al-4 wt % Cu alloy was dropped on the circumferential surface of the roll and solidified. The solidified material was observed with an optical microscope to measure the distance between secondary arms of dendrite, and the cooling rate was determined based on the distance.

(Gas Atomization)

An Ar (argon) gas was blown at a pressure of 40 kg/cm$^2$ through a discharge nozzle, and a molten raw material of an Al-4 wt % Cu alloy was dropped into the blown gas at a rate of 150 g/minute and solidified. Using a microscope to observe the solidified particles which were formed, the cooling rate was determined in the same manner as for the single-roller quenching.

(Rotating Electrode Method)

A molten raw material comprising an Al-4 wt % Cu alloy was cast to produce an electrode with a diameter of 20 mm. This was mounted on the anode side in an apparatus for the rotating electrode method and rotated at a rotational speed of 500 rpm, and solidified particles were obtained. The cooling rate was determined by the same method as described above.

For comparison, the cooling rate was determined by the same method as described above for a specimen which was solidified by casting into an ingot using the same molten raw material as above.

The results are shown in Table 1.

TABLE 1

| Cooling Method | Cooling Rate (° C./sec) |
| --- | --- |
| Single roller quenching | $10^3$–$10^5$ |
| Gas atomization | $10^3$–$10^5$ |
| Rotating electrode | $10^2$ |
| Ingot casting | 30 |

As can be seen from Table 1, each of single-roller quenching, gas atomization, and rotating electrode methods had a cooling rate of at least 100° C. per second and performed rapid solidification. Among these, single-roller quenching and gas atomization had a high cooling rate of at least 1000° C. per second. On the other hand, the cooling rate for ingot casting was 30° C. per second and was smaller than 100° C. per second.

[Manufacture of a Negative Electrode Material]

Using an Ni-52 wt % Si alloy, the effect of the cooling rate (cooling method) on the charging and discharging properties with Li as a negative electrode material for a nonaqueous electrolyte secondary battery was investigated.

A single element and a mother alloy were suitably blended so as to obtain a composition of 48 wt % Ni and 52 wt % Si, and they were melted in a high frequency induction melting furnace to make a uniform melt, which was used as a test material for each cooling method. In the rotating electrode method, an electrode which was obtained by casting the alloy melt into the form of a round rod having a diameter of 20 mm was used as a test material. For each cooling method, the cooling atmosphere was an argon atmosphere.

A portion of the solidified material obtained by each cooling method was subjected to heat treatment in an argon atmosphere at 900° C. for four hours. The primary Ni—Si intermetallic compound which precipitates during the solidification of an Ni-52 wt % Si alloy and which has the possibility of being used as an enveloping material is $NiSi_2$. The solidus temperature of this $NiSi_2$ is 993° C. After heat treatment, the solidified materials obtained by the single-roller quenching method and the ingot method were subjected to grinding.

Using test materials obtained by heat treatment of alloy particles obtained by each method (heat-treated materials) and test materials which were not heat-treated (as-solidified materials), the above-described negative electrode test was carried out and the discharge capacity and the cycle life: were evaluated. In addition, the cross section of the solidified material (before grinding in the cases in which grinding was performed) obtained by each cooling method was investigated by SEM. In each case, as shown in FIG. 4, the structure was one in which the matrix was an $NiSi_2$ phase and Si phase grains were present therein, either enveloped or not enveloped by an NiSi phase. The average diameter and the overall weight proportion (wt %) of the core of Si phase grains was investigated by SEM photograph (the average diameter was the average value of 100 randomly selected particles). The results are shown together with the results of the negative electrode test in Table 2.

TABLE 2

| | Heat treatment (900° C. × 4 hr) | | | | As-solidified (no heat treatment) | | | |
| --- | --- | --- | --- | --- | --- | --- | --- | --- |
| | | | Si phase$_{(2)}$ grains | | | | Si phase$_{(2)}$ grains | |
| | | Cycle | | | | Cycle | | |
| Cooling method | Discharge capacity$_{(1)}$ | life (%) | μm | wt % | Discharge capacity$_{(1)}$ | life (%) | μm | wt % |
| Single-roller quenching | 750 | 90 | 7 | 6 | 950 | 88 | 1 | 10 |
| Gas atomization | 750 | 90 | 12 | 6 | 950 | 89 | 1 | 10 |
| Rotating electrode method | 760 | 80 | 22 | 6 | 950 | 81 | 2 | 10 |
| Ingot method | 740 | 68 | 52 | 6 | 950 | 48 | 51 | 10 |

$_{(1)}$Units of discharge capacity are mAh/cc
$_{(2)}$For Si phase particles, μm indicates average particle diameter, wt % is weight % in material With alloy particles manufactured by rapid solidification at a cooling rate of at least 100° C. in accordance with the present invention, any of the cooling methods tested produces Si phase grains with an average diameter of at most 25 μm. In contrast, the test material manufactured by the comparative ingot method produced Si phase grains with an average diameter exceeding 50 μm. The test material, i.e., the alloy particles used for the negative electrode test had an average particle diameter of 30 μm. Accordingly, in the present invention, as the Si phase grains have an average diameter which is smaller than the average particle diameter of the alloy particles, the Si phase grains at least partially have an enveloping material. On the other hand, in the comparative method, the average diameter of the Si phase grains is far greater than the average particle diameter of the alloy particles, so there were numerous Si phase grains which were not enveloped at all by an enveloping material.

Looking at the results of the negative electrode tests, the value for the discharge capacity of a negative electrode made by the comparative ingot method was not so inferior to that for the present invention. However, it is important to note the cycle life. For the process of the present invention in which the average diameter of Si phase grains was smaller than 40 μm, the cycle life in each case was a high value of at least 80%. In contrast, for the comparative process, it was an unacceptable value of 48% or 68%. Among the examples of the present invention, the roller quenching and atomization methods produced Si phase grains having a small average diameter and giving a high cycle life of 88%.

Comparing heat treated materials and as-solidified materials, heat treatment caused the average diameter of an Si phase to increase and the weight ratio of Si phase grains to decrease. The as-solidified material for which the Si phase had a smaller average diameter and a higher weight ratio had a relatively high discharge capacity. The cycle life of the as-solidified material was either the same or only slightly inferior to that of the heat treated material due to the effect of fine dispersion of the Si phase grains.

Example 2

Using an Ni-52 wt % Si alloy, a negative electrode material was manufactured by gas atomization in the same manner as described in Example 1 except that the heat treatment temperature was changed. The average diameter of the Si phase grains of the resulting negative electrode material and the negative electrode test results are shown in Table 3 together with the heat treatment temperature.

TABLE 3

| Heat treatment temperature (° C.) | Discharge capacity (mAh/cc) | Cycle life (%) | Average diameter of Si phase grains (μm) |
|---|---|---|---|
| 900 | 750 | 90 | 12 |
| 800 | 745 | 90 | 8 |
| 700 | 745 | 90 | 3 |
| 600 | 740 | 92 | 2 |

TABLE 3-continued

| Heat treatment temperature (° C.) | Discharge capacity (mAh/cc) | Cycle life (%) | Average diameter of Si phase grains (μm) |
|---|---|---|---|
| No heat treatment | 950 | 89 | 1 |
| 985 | 750 | 69 | 53 |

As shown in Table 3, in the inventive process in which the heat treatment temperature was at least 10° C. below the solidus temperature of 993° C. of $NiSi_2$, which is the primary intermetallic compound formed during solidification of an Ni-52 wt % Si alloy, the average diameter of Si phase grains was no more than 40 μm, and the cycle life in each case was at least 90%. In contrast, in the comparative method in which heat treatment was performed at a temperature 8° C. below the solidus temperature, the average diameter of Si phase grains exceeded 40 μm due to the growth of the Si phase grains as a result of heat treatment, so restraint of the Si phase grains by the enveloping layer to prevent changes in volume of the grains could not work effectively, and the cycle life did not reach 80%.

Example 3

A negative electrode material was manufactured by gas atomization in the same manner as described in Example 1 except that the composition of the Ni—Si alloy raw material (expressed as wt % of Si) was changed (with heat treatment at 900° C. for 4 hours, or without heat treatment). The average diameter of the Si phase grains of the negative electrode material which was obtained and the results of the negative electrode tests are shown in Table 4.

TABLE 4

| Wt % Si | Heat treatment | Wt % Si phase grains | Discharge capacity (mAh/cc) | Cycle life (%) | Average diameter of Si phase grains (μm) | Comments |
|---|---|---|---|---|---|---|
| 52 | Yes | 6 | 750 | 90 | 12 | this |
|  | No | 10 | 950 | 87 | 1.0 | invention |
| 54 | Yes | 10 | 820 | 88 | 13 | this |
|  | No | 17 | 1035 | 84 | 1.5 | invention |
| 56 | Yes | 14 | 950 | 83 | 12 | this |
|  | No | 18.2 | 1200 | 80 | 2.0 | invention |
| 58 | Yes | 18 | 1180 | 81 | 12 | this |
|  | No | 22 | 1495 | 80 | 2.3 | invention |
| Carbon electrode |  |  | 450 | 80 | — | Comparative electrode |

As shown in Table 4, regardless of whether heat treatment was carried out or not, as the weight ratio represented by Si phase grains increased, the discharge capacity increased but the proportion represented by the enveloping material which restrains volume changes decreased, so the cycle life had a tendency to gradually decrease. Furthermore, for the same amount of Si, the material which had been heat treated had a lower discharge capacity, but it had a somewhat higher cycle life. However, compared to a presently used carbon electrode, the discharge capacity and the cycle life were comparable or mostly much higher.

Example 4

Using gas atomization in the same manner as described in Example 1, a substitution solid solution alloy was manufactured by substituting a portion of the Ni in an Ni-52 wt % Si alloy with other elements. A portion of the resulting alloy was heat treated in argon atmosphere at 850° C. for 8 hours. A negative electrode test was carried out using an as-solidified alloy and a heat-treated alloy. The alloy composition and the results of the negative electric tests are shown in Table 5.

TABLE 5

| | Heat treatment (800° C. × 8 hr) | | | | As-solidified (no heat treatment) | | | |
|---|---|---|---|---|---|---|---|---|
| Alloy Composition | Discharge capacity$_{(1)}$ | Cycle life (%) | Si phase$_{(2)}$ grains | | Discharge capacity$_{(1)}$ | Cycle life (%) | Si phase$_{(2)}$ grains | |
| | | | μm | wt % | | | μm | wt % |
| Ni-52Si | 750 | 90 | 12 | 6 | 950 | 89 | 1 | 10 |
| Ni-5Fe-52Si | 755 | 92 | 12 | 6 | 955 | 90 | 2 | 10 |
| Ni-5Co-52Si | 750 | 94 | 12 | 6 | 950 | 93 | 3 | 10 |

TABLE 5-continued

| | Heat treatment (800° C. × 8 hr) | | | | As-solidified (no heat treatment) | | | |
|---|---|---|---|---|---|---|---|---|
| Alloy Composition | Discharge capacity$_{(1)}$ | Cycle life (%) | Si phase$_{(2)}$ grains | | Discharge capacity$_{(1)}$ | Cycle life (%) | Si phase$_{(2)}$ grains | |
| | | | μm | wt % | | | μm | wt % |
| Ni-5Mn-52Si | 740 | 91 | 10 | 6 | 940 | 91 | 2 | 10 |
| Ni-5Cr-52Si | 740 | 93 | 11 | 6 | 940 | 90 | 1 | 10 |
| Ni-5Cu-52Si | 750 | 92 | 12 | 6 | 950 | 94 | 1 | 10 |

$_{(1)}$Units of discharge capacity are mAh/cc
$_{(2)}$For Si phase particles, μm indicates average particle diameter, wt % is weight % in material In Table 5, Ni-5Fe-52Si, for example, represents a 43 wt % Ni-5 wt % Fe-52 wt % Si alloy. The intermetallic compound NiSi$_2$ and a portion of the Ni in NiSi is substituted by Fe in solid solution. The same as for Fe applies for Co, Mn, Cr, and Cu.

As shown in Table 5, even when the enveloping material is a solid solution, a discharge capacity appropriate for the weight percent of the Si phase is obtained, and the cycle life is also satisfactory. Furthermore, as in Example 1, the Si phase is minute, and the as-solidified material having a high proportion thereof had a higher discharge capacity than the heat-treated material. The cycle life was good in either case.

Example 5

Using gas atomization in the same manner described with respect to Example 1, a negative electrode material of an as-solidified material and a heat-treated material was manufactured while varying the type and the amount of the second element which forms an alloy with Si and the heat treatment temperature. The composition of the alloying raw materials used, the solidus temperature of the principle intermetallic compound precipitated during the solidification of this binary alloy, and the heat treatment temperature employed are shown in Table 6 together with the average diameter of the Si phase grains of the resulting negative electrode material and the negative electrode test results.

TABLE 6

| | Solidus | | Heat treated | | | | As-solidified (no heat treatment) | | |
|---|---|---|---|---|---|---|---|---|---|
| $^{1)}$Composition of raw materials | Temperature (° C.) | Composition at solidus temperature | Heat treatment temperature (° C.) | Average diameter of Si phase grains (μm) | Discharge capacity (mAh/cc) | Cycle life (%) | Average diameter of Si phase grains (μm) | Discharge capacity (mAh/cc) | Cycle life (%) |
| Mg41Si | 946 | MgSi$_2$ | 900 | 12 | 577 | 94 | 3 | 630 | 89 |
| Ca62Si | 1030 | CaSi$_2$ | 990 | 11 | 898 | 94 | 2 | 1070 | 90 |
| Ni52Si | 993 | NiSi$_2$ | 900 | 12 | 750 | 90 | 1 | 950 | 89 |
| Fe63Si | 937 | FeSi$_2$ | 900 | 17 | 692 | 89 | 2 | 850 | 88 |
| Co65Si | 1259 | CoSi$_2$ | 1200 | 18 | 654 | 86 | 3 | 990 | 92 |
| Mn55Si | 1150 | Mn$_4$Si$_7$ | 1100 | 16 | 620 | 87 | 3 | 820 | 91 |
| Ti77Si | 1330 | TiSi$_2$ | 1280 | 15 | 713 | 86 | 3 | 960 | 88 |
| Pr52Si | 1212 | PrSi$_2$ | 1100 | 13 | 587 | 85 | 2 | 750 | 85 |
| Nd52Si | 1197 | NdSi$_2$ | 1100 | 11 | 585 | 86 | 2 | 750 | 86 |
| Ce60Si | 1200 | CeSi$_2$ | 1100 | 11 | 578 | 87 | 3 | 840 | 86 |
| Cu20Si | 802 | CuSi$_2$ | 600 | 10 | 494 | 84 | 3 | 670 | 87 |
| Cr74Si | 1305 | CrSi$_2$ | 1200 | 12 | 865 | 84 | 2 | 1050 | 88 |
| W28Si | 1390 | WSi$_2$ | 1340 | 13 | 642 | 84 | 3 | 820 | 85 |

$^{1)}$The number before Si indicates the wt % of Si (for example, Mg41Si indicates a composition of 59 wt % Mg and 41 wt % Si).

As shown in Table 6, as a negative electrode material was manufactured with varying the element forming an intermetallic compound or solid solution with Si, the discharge capacity varied, but the cycle life was good in each case. The discharge capacity for the as-solidified material was higher.

Example 6

This example illustrates the case in which a negative electrode material according to this invention is formed in accordance with the above-described Manufacturing Process 2 (adhering layer-forming method). As described below, Samples 1–7 of alloy particles were prepared.

(1) A spherical-shaped Si powder obtained by argon gas atomization and having an average particle diameter of approximately 30 μm were plated with nickel to a thickness of approximately 1 μm using a commercially available alkaline electroless nickel plating solution. The resulting Ni-plated Si powder was then heat treated in an argon gas atmosphere at 700° C. for 4 hours to obtain alloy particles with an average particle diameter of 32 μm. The cross section of the powder after heat treatment was observed with an optical microscope, and it was seen that Si powder was enveloped in an NiSi$_2$ layer (the composition of which was determined by EPMA) with a thickness of approximately 1 μm. This negative electrode material was made Sample 1.

The solidus temperature of the NiSi$_2$ enveloping material was 983° C., as shown in Example 1 and Table 5. The heat treatment temperature was at least 10° C. lower than this solidus temperature.

(2) A spherical Si powder which had been prepared by gas atomization in the same manner as in Sample 1 was subjected to the MA method along with an Ni powder having an average particle diameter of 1 μm for ten hours in a planetary ball mill (Fritsch Model P-5) to form an adhering layer of the Ni powder on the surface of the Si powder. Heat treatment was then performed in the same manner as for Sample 1 to obtain alloy particles with an average particle diameter of 32 μm. A layer of NiSi$_2$ with a thickness of approximately 1 μm which enveloped the surface of the Si powder was formed. This negative electrode material was made Sample 2.

(3) An Ni—Si alloy powder having a chemical composition with a weight ratio of Ni to Si of 20:80 and an average particle diameter of 30 μm was prepared by gas atomization in the same manner as for Sample 1. The alloy powder was subjected to electroless Ni plating to form an Ni layer with a thickness of approximately 1 μm on the surface of the powder and subsequent heat treatment both in the same manner as for Sample 1. The heat-treated powder which had an average diameter of 32 μm included a core of Si phase grains of a structure in which an NiSi$_2$ phase was precipitated in an Si phase matrix and the core was enveloped by an NiSi$_2$ layer having a thickness of approximately 1 μm. This negative electrode material was made Sample 3.

(4) An Si powder prepared by gas atomization in the same manner as for Sample 1 and having an average particle diameter of approximately 30 μm was subjected for 10 hours to the MA method in a planetary ball mill (Fritsch Model P-5) with a powder mixture of Ni powder having an average particle diameter of 1 μm and 1 wt % of TiC powder manufactured by Wako Junyaku having an average particle diameter of 0.6 μm to adhere the mixed powder to the surface of the Si powder. Thereafter, heat treatment was performed in an Ar gas atmosphere at 700° C. for 4 hours to obtain alloy particles. This negative electrode material was made Sample 4.

When the cross section of the powder of Sample 4 after heat treatment was observed on an optical microscope, it was found that an enveloping layer made from an NiSi$_2$ phase with a thickness of approximately 1 μm was formed on the surface of the Si powder. Fine TiC precipitates with a size of 0.1 μm or less could be observed within the NiSi$_2$ phase. (The NiSi$_2$ phase was determined by the weight ratio of Ni and Si by EMPA analysis. The fine precipitate had a size smaller than the beam diameter used in the EMPA analysis, but Ti and C could always be detected, so it was presumed to be TiC).

The precipitated particle size of the TiC phase was smaller than the particle size of the TiC powder which was used. This was thought to be because the TiC powder used (in which primary particles cohered to become 0.6 μm powder) are disintegrated into primary particles (at most 0.1 μm) by the mechanical energy of the MA method.

(5) In the same manner as for Sample 4, in place of TiC, an SiC powder manufactured by Wako Junyaku with an average particle diameter of 0.27 μm was mixed with the Ni powder at a weight ratio of 1% and subjected to the MA processing, and heat treatment was performed under the same conditions to obtain a negative electrode material, which was made Sample 5.

(6) For comparison, an Ni-80 weight % Si alloy was manufactured by the ingot method and was subjected to heat treatment in an Ar gas atmosphere at 700° C. for eight hours. The resulting alloy had a structure in which an NiSi$_2$ phase was precipitated in an Si phase matrix, but the NiSi$_2$ phase was coarse. The ingot was subjected to grinding in an inert atmosphere and was classified to obtain a powder with an average particle diameter of approximately 32 μm. Because the NiSi phase was coarse, the resulting powder had various structures including that with just an Si phase, that with both an Si phase and an NiSi$_2$ phase, and that with just an NiSi$_2$ phase. This Ni—Si alloy powder was made Sample 6.

(7) An ingot powder of an Ni-80 wt % Si alloy having an average particle diameter of 30 μm which was prepared in the same method as for Sample 6 was subjected to Ni plating by electroless plating and followed by heat treatment in the same manner as for Sample 1 to produce alloy particles. The core structure of this powder was the same as for Sample 6. An enveloping material containing an NiSi$_2$ or NiSi phase was formed on the surface of the powder. The NiSi$_2$ phase present in the core of Si phase grains was coarse, as for Sample 6. A powder (average particle diameter of 32 μm) of these alloy particles was made Sample 7.

The alloy particles of each of Sample 1 through Sample 7 had an average particle diameter of approximately 32 μm. It was confirmed that the chemical composition for Samples 1, 2 and 4–6 was Ni:Si=20:80, and for Samples 3 and 7 was Ni:Si=36:64. The results of negative electrode tests using these samples of negative electrode materials are shown in Table 7.

TABLE 7

| Sample No. | Discharge capacity (mAh/cc) | Cycle life (%) | Comments |
| --- | --- | --- | --- |
| 1 | 1950 | 90 | this invention |
| 2 | 1950 | 83 | this invention |
| 3 | 1350 | 90 | this invention |
| 4 | 1930 | 92 | this invention |
| 5 | 1920 | 92 | this invention |
| 6 | 1940 | 25 | Comparative |
| 7 | 1340 | 85 | this invention |

As shown in Table 7, the magnitude of the discharge capacity principally depends on the weight percent of Si. The discharge capacity was high for Samples 1, 2, and 4–6 having a high Si content. However, Sample 6, which was a comparative example without an enveloping material, had an extremely short cycle life and was not acceptable. On the other hand, in the case in which an enveloping material was formed around an Si phase grain according to the present invention, the cycle life had a good value of at least 80%. In particular, Samples 4 and 5 which had finely dispersed TiC or SiC in an enveloping material had the best cycle life.

Example 7

In the same manner as for Sample 1 of Example 6, an Si powder was subjected to electroless nickel plating, after which heat treatment was carried out to manufacture a negative electrode material made from alloy particles in which Si phase grains are enveloped in an NiSi$_2$ phase. However, the concentration of the electroless nickel plating solution was varied to give a different plating thickness. The results of negative electrode tests performed on this negative electrode material are shown in Table 8 together with the results of the weight ratio of the Si phase grains. The weight ratio of Si phase grains was found by measuring the proportion of the area occupied by Si phase grains by a microscopic observation and then multiplying the specific gravity of each phase by the proportion of the total area occupied by the phase.

TABLE 8

| Plating thickness (μm) | Weight percent Si phase grains | Discharge capacity (mAh/cc) | Cycle life (%) |
|---|---|---|---|
| 0.1 | 98 | 2800 | 80 |
| 0.15 | 94 | 2600 | 80 |
| 0.8 | 72 | 2200 | 80 |
| 1.5 | 50 | 1700 | 85 |
| 3.5 | 45 | 1600 | 85 |

As shown in Table 8, when Manufacturing Process 2 is employed, the weight ratio of Si phase grains can be as high as 98 wt % and a good cycle life is obtained in such a case. The higher is the proportion of Si phase grains, the higher is the discharge capacity, so with Manufacturing Process 2, an extremely high discharge capacity exceeding 2000 mAh/cc can be realized.

Accordingly, taking into consideration manufacturing equipment and manufacturing costs, by suitably using Manufacturing Process 1 or 2, a negative electrode material for which the weight ratio of Si phase grains is at least 5 wt % and up to 99 wt % can be manufactured.

Example 8

Except for varying the heat treatment temperature, a negative electrode material made of alloy particles in which Si phase grains are enveloped in $NiSi_2$ phase was manufactured in the same manner as for Sample 1 of Example 6. The results of negative electrode tests are shown in Table 9 together with the heat treatment temperature and the average diameter of Si phase grains. The weight ratio of Si phase grains in this case was approximately 50 wt % for each material.

TABLE 9

| Heat treatment temperature ° C. | Average diameter of Si phase grains (μm) | Discharge capacity (mAh/cc) | Cylcle life (%) |
|---|---|---|---|
| 985 | Sintered during heat treatment so could not be tested | — | — |
| 830 | 27 | 1950 | 92 |
| 700 | 26 | 1950 | 90 |
| 600 | 20 | 1940 | 90 |
| 500 | 15 | 1940 | 88 |

Note:
The solidus temperature of $NiSi_2$ was 993° C.

When the heat treatment temperature was 985° C., which was only 8° C. lower than the solidus temperature of 993° C., the powder was sintered and could not be used as a test material. Material which was treated in accordance with the present invention had a high discharge capacity, and its cycle life was also good.

Example 9

In the same manner as in Example 7, Si powder which was prepared by gas atomization and had an average particle diameter of 30 μm was subjected to electroless plating with various metals, after which heat treatment was carried out at the temperatures shown in Table 10 (for four hours in each case), and a negative electrode material made from alloy particles in which Si phase grains were enveloped in the indicated intermetallic compound or solid solution was manufactured. The plating thickness of each element was adjusted depending on its specific gravity so that the weight ratio of Si phase would be 50 wt % in each case. The results of negative electrode tests on this negative electrode material are also shown in Table 10.

For comparison, the results of a negative electrode tests performed on a carbon material as a typical presently used negative electrode material are also shown.

TABLE 10

| Plating element | Solidus temperature (° C.) | Heat treatment temperature (° C.) | Composition at solidus temperature | Discharge capacity (mAh/cc) | Cycle life (%) |
|---|---|---|---|---|---|
| Mg | 946 | 700 | $MgSi_2$ | 1700 | 90 |
| Ca | 1030 | 800 | $CaSi_2$ | 1700 | 90 |
| Fe | 937 | 700 | $FeSi_2$ | 1680 | 85 |
| Co | 1259 | 950 | $CoSi_2$ | 1690 | 85 |
| Ni | 993 | 700 | $NiSi_2$ | 1700 | 90 |
| Mn | 1150 | 900 | $Mn_4Si_7$ | 1690 | 87 |
| Ti | 1330 | 950 | $TiSi_2$ | 1700 | 84 |
| Pr | 1212 | 950 | $PrSi_2$ | 1680 | 85 |
| Nd | 1197 | 950 | $NdSi_2$ | 1700 | 83 |
| Ce | 1200 | 950 | $CeSi_2$ | 1700 | 84 |
| Cu | 802 | 600 | $CuSi_2$ | 1700 | 84 |
| Cr | 1305 | 950 | $CrSi_2$ | 1700 | 80 |
| W | 1390 | 1000 | $WSi_2$ | 1700 | 80 |
| *Al | 577 | 500 | Al | 1850 | 80 |
| *Pb | 328 | 300 | Pb | 1840 | 80 |
| Carbon material | — | — | — | 450 | 80 |

*The coating layer was an Al—Si or Pb—Si solid solution.

As shown in Table 10, even if the elements of the adhering layer formed by plating are varied, a negative electrode material having a higher discharge capacity compared to carbon can be obtained. In addition, in each case the cycle life was a good value of at least 80%. For those cases in which the enveloping material is a solid solution of Al or Pb, which itself can occlude and release Li, the discharge capacity was comparatively large.

Example 10

This example illustrates an example of manufacturing a negative electrode by Manufacturing Process B.

Si powder having a particle diameter of at most 25 μm and an average particle diameter of 15 μm was prepared by argon gas atomization, and in the same manner as described with respect to the negative electrode tests, a slurry was prepared from the Si powder having no adhering layer. This slurry was coated to a thickness of approximately 25 μm on an electroplated copper foil and dried to form an Si powder layer on the copper foil.

The Si powder layer was subjected to electroless or electrolytic plating with the elements shown in Table 11 to form an adhering layer on the surface of the Si powder layer. Thereafter, heat treatment was carried out in an argon atmosphere at the temperatures shown in Table 11 (with duration of four hours) to produce a negative electrode for a nonaqueous electrolyte secondary battery. The thickness of each plated adhering layer was 3 μm. The weight ratio of Si phase grains varied somewhat depending upon the specific gravity of the enveloping material formed by plating and heat treatment, but in each case it was around 50 wt %.

The properties of the negative electrode manufactured in this manner were measured in a three-electrode cell in the same manner as described above with respect to the negative electrode test. The results of measurement are also shown in Table 11.

TABLE 11

| Adhered element | Plating method | Solidus temperature (° C.) | Heat treatment temperature (° C.) | Discharge capacity (mAh/cc) | Cycle life (%) |
|---|---|---|---|---|---|
| Ni | Electroless | 993 | 700 | 1700 | 85 |
| Fe | Electrolytic | 937 | 700 | 1680 | 80 |
| Co | Electroless | 1259 | 950 | 1700 | 85 |
| Mn | Electrolytic | 1150 | 900 | 1690 | 82 |
| Ti | Electrolytic | 1330 | 950 | 1700 | 80 |
| Pr | Electrolytic | 1212 | 950 | 1690 | 80 |
| Nd | Electrolytic | 1197 | 950 | 1710 | 80 |
| Ce | Electrolytic | 1200 | 950 | 1700 | 80 |
| Cu | Electroless | 802 | 600 | 1680 | 80 |
| Cr | Electrolytic | 1305 | 950 | 1690 | 80 |
| Carbon electrode | | | | 450 | 80 |

As shown in Table 11, also in accordance with Manufacturing Process B in which an Si powder layer was first formed and then subjected to plating to form an adhering layer of a second element followed by heat treatment to form an enveloping material, a negative electrode having a good discharge capacity and cycle life could be manufactured.

Example 11

In the same manner as in Example 9, an adhering layer of Ni, Mg, Ca, Co, Fe, or W was formed on the surface of Si powder by electroless plating, and heat treatment was performed to obtain a negative electrode material made from alloy particles. Using this material, a lithium ion secondary battery was assembled, and a battery test was carried out as described below. For comparison, a battery using a presently used carbon material as a negative electrode was manufactured in the same manner, and similar tests were carried out. The results are shown in Table 12.

Figure 1:
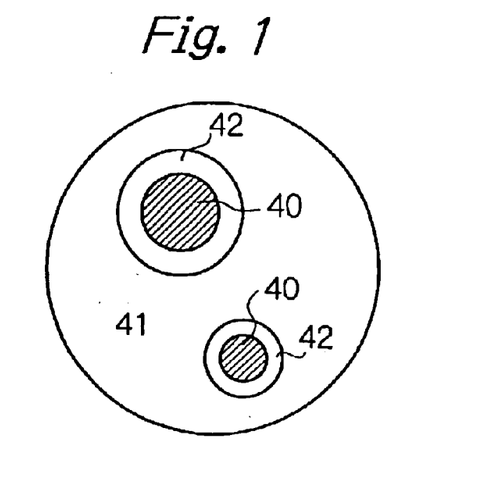
FIG. 1 is an explanatory view showing one example of a structure of alloy particles according to this invention.
Figure 2:
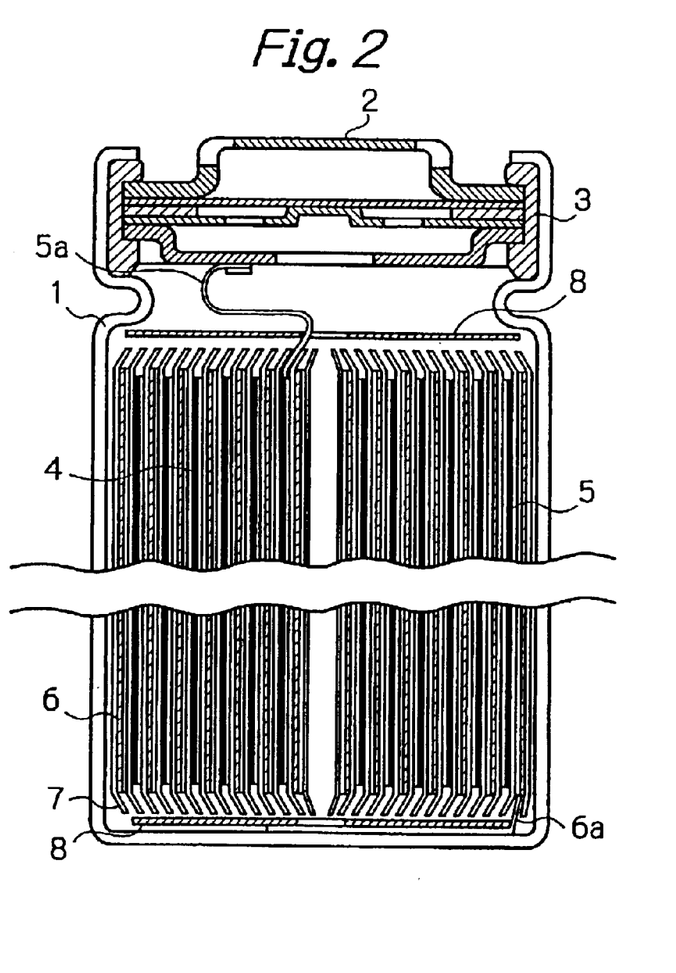
FIG. 2 is a cross-sectional view showing the structure of a non-aqueous electrolyte secondary battery which was prepared as a test battery for an example.

FIG. 2 schematically shows a vertical cross section of a cylindrical nonaqueous electrolyte secondary battery used in this example. In FIG. 2, 1 is a battery case made by forming of a stainless steel plate having resistance to an organic electrolyte solution, 2 is a sealing plate equipped with a safety valve, and 3 is an electrically insulating packing. 4 is a group of electrode plates. A positive electrode plate 5 and a negative electrode plate 6 with a separator 7 therebetween are wrapped a plurality of turns into a spiral shape and are housed within the case. An aluminum lead 5a for positive electrode extends from the positive electrode plate 5 and is connected to the sealing opening plate 2, and a nickel lead 6a for negative electrode extends from the negative electrode plate 6 and is connected to the bottom of the battery case 1. 8 is an electrically insulating ring provided on the top and bottom, respectively, of the electrode plate group 4.

The positive electrode plate 5 was manufactured in the following manner.

First, lithium carbonate and cobalt carbonate were mixed in prescribed proportions, and then this mixture was sintered in air at 900° C. for a sufficient length of time to give $LiCoO_2$ serving as an active material for positive electrode. To 100 parts by weight of powder of $LiCoO_2$, three parts by weight of acetylene black as an electrically conducting assistant and five parts by weight of a fluororesin binder were mixed, and the mixture was dispersed in N-methylpyrrolidone to form a paste. The paste was coated on both surfaces of aluminum foil having a thickness of 0.020 mm and dried to produce a positive electrode plate with a thickness of 0.130 mm, a width of 35 mm, and a length of 270 mm. An aluminum piece was attached as a positive electrode lead.

The manufacturing process for a negative electrode plate 6 was as follows.

100 parts by weight of a negative electrode material made from alloy particles prepared in accordance with Example 9 were mixed with 10 parts by weight of a styrene-butadiene rubber binder and three parts by weight of acetylene black as an electrically conducting additive, and the mixture was dispersed in an aqueous solution of carboxymethylcellulose to form a paste. The paste was coated on both surfaces of a copper foil having a thickness of 0.015 mm and dried to produce a negative electrode plate with a thickness of 0.2 mm, a width of 37 mm, and a length of 300 mm.

The positive electrode plate and a negative electrode plate manufactured in the above-described manner were wrapped into the shape of a spiral with a separator disposed therebetween and then housed in a battery case with a diameter of 13.8 mm and a height of 50 mm. A solution of $LiPF_6$, dissolved with 1M concentration in an equal volume mixed solvent of ethylene carbonate and ethyl methyl carbonate was used as an electrolyte solution. This solution was poured into an electrode plate group 4, and then the opening of the battery was sealed with a lid to manufacture test batteries A–F (the elements used for plating were respectively Ni, Mg, Ca, Fe, Co, and W). A test battery G in which the negative electrode material was a carbon material was manufactured in the same manner.

These batteries were subjected to a charging and discharging cycle test with a charge and discharge current of 100 mA and with a charge cut-off voltage of 4.2 volts and a discharge cut-off voltage of 25 volts. The charge and discharge capacity was measured on the first cycle, the discharge capacity was measured after the 500th cycle, and the proportion (%) of the discharge capacity on the 500th cycle with respect to the discharge capacity on the first cycle was determined as the cycle life.

The charge and discharge capacity on the first cycle, the discharge capacity after the $500^{th}$ cycle, and the cycle life of these batteries are shown in Table 12.

TABLE 12

| Battery Symbol | Plating element | Charging capacity 1st cycle | Discharge capacity 1st cycle | Discharge capacity 500th cycle | Cycle life |
|---|---|---|---|---|---|
| A | Ni | 945 | 900 | 834 | 93 |
| B | Mg | 923 | 879 | 791 | 90 |
| C | Ca | 935 | 890 | 810 | 91 |
| D | Fe | 820 | 780 | 679 | 87 |
| E | Co | 840 | 800 | 704 | 88 |
| F | W | 800 | 760 | 654 | 86 |
| G* | — | 530 | 500 | 400 | 80 |

*Carbon material negative electrode

For each of the elements adhered to the Si powder, the nonaqueous electrolyte secondary batteries according to the present invention had a much higher capacity than the comparative battery using a carbon material as a negative electrode material, and they also had a high cycle life, so the results thereof were good.

What is claimed is:

1. A process for manufacturing a negative electrode material for a nonaqueous electrolyte secondary battery, which is made from alloy particles of a structure comprising one or more Si phase grains at least partially enveloped in a phase consisting essentially of an Si-containing solid solution or Si-containing intermetallic compound, the process comprising solidifying a melt of raw materials for the alloy particles by cooling so as to obtain a cooling rate of at least 100° C. per second and forming said alloy particles of a structure comprising one or more Si phase grains at least partially enveloped in a phase of a Si-containing solid solution or Si-containing intermetallic compound.

2. A process of manufacturing a negative electrode material for a nonaqueous electrolyte secondary battery as claimed in claim 1, wherein the cooling at a rate of at least 100° C. per second is carried out by a method selected from the group consisting of the atomization method, the roller quenching method, and the rotating electrode method.

3. A process of manufacturing a negative electrode material for a nonaqueous electrolyte secondary battery as claimed in claim 1, further including subjecting the alloy to heat treatment at a temperature at least 10° C. below the solidus temperature of the Si-containing solid solution or Si-containing intermetallic compound.

4. A process of manufacturing a negative electrode material for a nonaqueous electrolyte secondary battery as claimed in claim 1, wherein the cooling rate is at least 1000° C. per second.

5. A process of manufacturing a negative electrode material for a nonaqueous electrolyte secondary battery as claimed in claim 1, wherein the negative electrode material which is manufactured contains at least 5 wt. % and at most 99 wt. % of Si phase grains, and the average particle diameter of the alloy particles is at least 0.1 $\mu$m and at most 50 $\mu$m.

6. A process of manufacturing a negative electrode material for a nonaqueous electrolyte secondary battery as claimed in claim 1, wherein the Si-containing solid solution or intermetallic compound is made from Si and at least one element selected from the group consisting of Group 2A elements, transition elements, Group 3B elements and Group 4B elements other than Si from the long form periodic table.

7. A nonaqueous electrolyte secondary battery equipped with a nonaqueous electrolyte and positive and negative electrodes which can reversibly occlude and release lithium, wherein the negative electrode is a negative electrode containing a negative electrode material manufactured by the process of claim 1.

8. A process for manufacturing a negative electrode material for a nonaqueous electrolyte secondary battery, which is made from alloy particles of a structure comprising one or more Si phase grains at least partially enveloped in a phase consisting essentially of an Si-containing solid solution or Si-containing intermetallic compound, the process comprising forming an adhering layer of a material by a mechanical alloying method which contains an element capable of forming a solid solution or an intermetallic compound with Si, on the surface of a powder of metallic Si or an alloy having an Si phase, and subjecting the powder having the adhering layer to heat treatment at a temperature at least 10° C. below the solidus temperature of the solid solution or the intermetallic compound to convert the material forming the adhering layer to form an Si-containing solid solution or Si-containing intermetallic compound.

9. A process of manufacturing a negative electrode material for a nonaqueous electrolyte secondary battery as claimed in claim 8, wherein the negative electrode material which is manufactured contains at least 5 wt. % and at most 99 wt. % of Si phase grains, and the average particle diameter of the alloy particles is at least 0.1 $\mu$m and at most 50 $\mu$m.

10. A process of manufacturing a negative electrode material for a nonaqueous electrolyte secondary battery as claimed in claim 8, wherein the Si-containing solid solution or intermetallic compound is made from Si and at least one element selected from the group consisting of Group 2A elements, transition elements, Group 3B elements, and Group 4B elements other than Si from the long form periodic table.

11. A nonaqueous electrolyte secondary battery equipped with a nonaqueous electrolyte and positive and negative electrodes which can reversibly occlude and release lithium, wherein the negative electrode is a negative electrode containing a negative electrode material manufactured by the process of claim 8.

12. A process of manufacturing a negative electrode for a nonaqueous electrolyte secondary battery, comprising adhering a powder of metallic Si or of an alloy containing an Si phase on a negative electrode substrate to form a powder layer on the substrate, plating the powder layer with a material comprising an element capable of forming a solid solution or intermetallic compound with Si, and thereafter performing heat treatment at a temperature at least 10° C. below the solidus temperature of the solid solution or intermetallic compound so as to convert the plating to form an Si-containing solid solution or Si-containing intermetallic compound.

13. A process of manufacturing a negative electrode for a nonaqueous electrolyte secondary battery as claimed in claim 12, wherein the Si-containing solid solution or intermetallic compound is made from Si and at least one element selected from the group consisting of Group 2A elements, transition elements, Group 3B elements, and Group 4B elements other than Si from the long form periodic table.

14. A nonaqueous electrolyte secondary battery equipped with a nonaqueous electrolyte and positive and negative electrodes which can reversibly occlude and release lithium, wherein the negative electrode is a negative electrode manufactured by the process of claim 12.

15. A process of manufacturing a negative electrode material for a nonaqueous electrolyte secondary battery as claimed in claim 8, wherein the heat treatment is a diffusion heat treatment at a temperature no greater than at least 10° C. below the solidus temperature of the solid solution or the intermetallic compound.

16. A process of manufacturing a negative electrode for a nonaqueous electrolyte secondary battery as claimed in claim 12, wherein the heat treatment is a diffusion heat treatment at a temperature no greater than at least 10° C. below the solidus temperature of the solid solution or the intermetallic compound.

* * * * *